July 17, 1973   D. L. BANFIELD   3,746,591
METHOD OF MAKING A SEMI-PERMEABLE MEMBRANE TUBE
Filed July 14, 1970
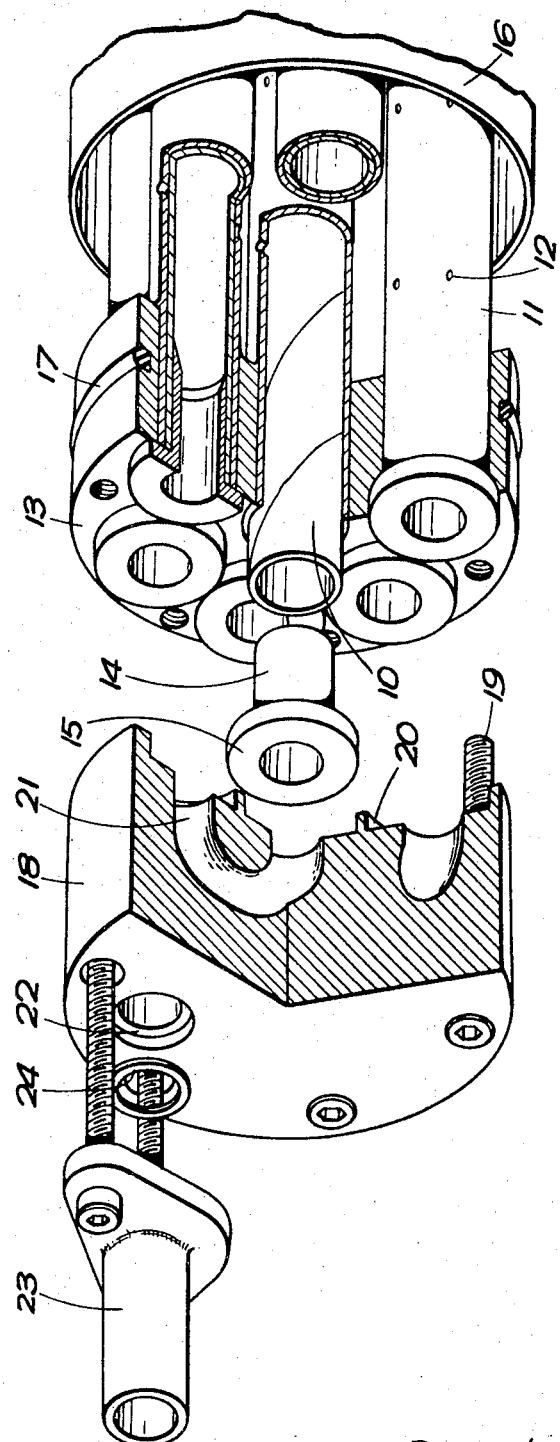
INVENTOR
DAVID LESLIE BANFIELD
BY
Bacon & Thomas
ATTORNEYS

3,746,591
METHOD OF MAKING A SEMI-PERMEABLE MEMBRANE TUBE

David Leslie Banfield, Whitchurch, England, assignor to United Kingdom Atomic Energy Authority, London, England
Filed July 14, 1970, Ser. No. 54,800
Claims priority, application Great Britain, July 16, 1969, 35,851/69
Int. Cl. B31c 9/00; B01d 25/20
U.S. Cl. 156—191      8 Claims

ABSTRACT OF THE DISCLOSURE

In the production of semi-permeable membrane assemblies one or more porous fibrous tapes are spirally wound into a tube and the membrane is provided as the inner or outer ply during or after winding. During winding at least one tape is overlapped on itself by up to 25% of its width and the overlapped portions are sealed.

---

The present invention relates to reverse osmosis membrane assemblies.

Reverse osmosis or "hyperfiltration" is a well known means of producing "potable" water, usually containing less than 500 p.p.m. dissolved solids, from, for example, brackish water or sea water, of purifying industrial effluents, or of concentrating solutions. In reverse osmosis the solution to be treated is contacted under pressure with the surface of a semi-permeable membrane, e.g. a membrane of modified cellulose acetate (see British specification No. 1,056,636), and provided the pressure on the solution exceeds the osmotic pressure thereof by a sufficient amount, then pure solvent is forced through the membrane while solute is rejected and remains on the solution side of the membrane.

Heretofore it has been proposed that semi-permeable membrane assemblies for use in reverse osmosis should comprise a multi-ply elongated porous tube wound from tapes and having a semi-permeable reverse osmosis membrane as an inner ply or the innermost ply thereof. Assemblies of this type usually contain four or more plies since the smaller the number of plies, the lower the pressure at which the assembly can be worked.

We have now found surprisingly that a strong membrane assembly containing only one or two membrane supporting plies, although it may contain more, can be produced by overlapping the only or at least one ply on itself and sealing the overlapped portions of the ply.

Accordingly the invention provides a method of producing a semi-permeable membrane assembly, which method comprises spirally winding one or more porous fibrous tapes into a single or multi-ply tube in which the only ply, or at least one ply is overlapped on itself by up to 25% of its width, at least one tape which provides an overlapped ply being heat- or solvent-sealable to itself, and heat- or solvent-sealing at least the overlapped portions of one ply, the semi-permeable membrane being provided as the inner or the outer ply during or after winding.

Preferably the overlapped ply is overlapped by no more than 10% of its width.

Where more than one tape is used more than one tape may be overlapped, again by up to 25% of the width thereof, preferably by no more than 10% of the width. Also where more than one tape is overlapped each may be sealable and if desired more than one may be sealed. Further where more than two tapes are used, an intermediate ply may be sealed, where this is possible, and may provide the only sealed ply. It is preferred, however, that the tube be wound from one tape or two tapes, and in the latter case that only one tape be sealable to itself.

The method of the invention may be carried out by winding a tape or tapes of the desired width and with adhesive on the appropriate sides by means of a flexible belt on the mandrel of a conventional tube winding machine. The mandrel may, for example, be designed to produce a tube having a diameter of from ¼" (6.4 mm.) to 2" (50.8 mm.), e.g. ½" (12.7 mm.), ¾" (19.1 mm.) or 1" (25.4 mm.).

Each porous fibrous tape may comprise organic or inorganic fibres and may be made by any known continuous construction technique such as weaving, air laying or paper making provided those to be sealed are sealable as mentioned above. Preferably each sealable tape consists of a paper made from synthetic fibres so that it can be fused to itself, for example, it may be a paper comprising polyester fibres. Any other ply is also preferably provided by a paper tape, the paper being made from natural or synthetic fibres.

Where more than one tape is employed the adhesive used in the tube winding operation to seal one tape to the next may be permeable or impermeable, but where the adhesive is impermeable it should be applied to the tape in such a manner e.g. as a pattern, that the resultant tube is permeable. The adhesive should also be one which gives good initial tack and which will set almost instantaneously and will usually be a hot melt or a fusible adhesive. Preferably the adhesive is a powdered thermoplastic, for example, polyethylene, applied evenly.

The surface of the tape which is to be provided with a membrane, may be treated before or after winding but before application of the membrane with a modifying agent to render the surface more acceptable to the membrane by altering the surface roughness and the interfacial tension between the surface and the membrane.

The semi-permeable reverse osmosis membrane may be provided by applying it to either the inner or the outer surface of the tube after the tube has been formed. For example, a membrane may be cast onto the inside of the tube by a bob casting technique. In using such a technique the tube is passed over a flexibly secured bob. A sufficient quantity of membrane forming dope is introduced into the tube which is then allowed to move relatively over the bob at a controlled speed. The uniform layer of dope spread by the bob is subjected to air drying of controlled duration, during which an asymmetric surface is formed. The tube then enters a cold water bath where excess solvents and swelling agents or modifiers are leached from the membrane. Finally, the membrane may be cured in a hot water bath.

Alternatively, the membrane may be provided by coating one surface of the tape which provides the inner or outer ply with a suitable membrane material before the ply is wound with the coated side innermost or outermost, respectively. Such coating may be achieved by extrusion.

Further, the membrane may be in sheet form, and may be split into a tape and wound in an overlapping relationship, with a suitable adhesive, as the inner or the outer ply with the remaining one or more porous fibrous tapes.

It will be understood that where the membrane is provided before an overlapped ply is sealed, the sealing conditions must be carefully chosen to ensure there is no damage to the membrane.

A preferred membrane is a modified cellulose acetate membrane of the type known in the art (see, for example, U.K. specification No. 1,056,636).

The invention also includes solvent separation apparatus comprising a plurality of membrane assemblies produced by the method of the invention arranged with their longitudinal axes substantially parallel and sealed to means for circulating a solution to be treated through or over the assemblies. Preferably each set of ends of the membrane assemblies are mounted in solution-tight engagement with an end cap, passages in the end caps being in communication with the interior of the assemblies and the passages being so arranged that solution can be supplied back and forth through the assemblies in succession.

Where a membrane assembly is required to work at high pressures, the invention also provides the use of a metal tube containing a plurality of holes in the walls thereof for egress of solvent as a support for a tubular membrane assembly positioned inside or outside the tube. The tube is preferably constructed from stainless steel or aluminium alloy and preferably contains one to four holes per sq. inch of surface, each hole preferably about 1 mm. diameter or less.

Thus, the invention includes, in a modification, a solvent separation apparatus as described above in which each membrane assembly comprises a multi-layer porous fibrous tube provided with a semi-permeable membrane as one layer of the tube, e.g. as described herein, and each membrane assembly is supported on or within a perforated metal tube.

Where the membrane assembly has an outer or inner ply which is adjacent to a perforated support tube, and where such a ply is not overlapped on itself and sealed as described above, weak points may occur where a tape joint registers with a hole or holes in the support tube. Accordingly, it is preferred that the support tube be combined with an assembly produced by the method of the invention.

The invention further provides an end cap for use in solvent separation apparatus as described above which end cap is moulded in one piece from a plastic material and is provided with at least one U-shaped passage each end of which communicates with the same one face of the cap.

In one embodiment of the end cap it is also provided with a further passage, separate from the U-shaped passage, extending therethrough and communicating with the said one face of the cap and the other opposite face of the cap, for ingress or egress of solution.

In a second embodiment of the cap it is also provided with two further passages, separate from each U-shaped passage, extending therethrough and communicating with the said one face of the cap and the other opposite face of the cap, one passage being for ingress of solution and the other for egress of solution.

The caps of the first embodiment are used in asymmetric pairs, one at each end of each set of membrane assemblies, the further passage in one cap of the pair being for ingress of solution and the further passage in the other cap for egress of solution.

The caps of the second embodiment are each used with a cap which is not provided with further passages, the number of U-shaped passages in the latter being one more than the number of U-shaped passages in the former. Again one cap is located at one end of each set of membrane assemblies and the other cap is located at the other end.

The end caps of the first embodiment are preferably provided with three, six, or nine U-shaped passages, and those of the second embodiment with five or eight U-shaped passages. Correspondingly those caps which are not provided with further passages are preferably provided with six or nine U-shaped passages.

The end caps are preferably moulded in glass filled epoxy resin. The caps may be produced in a single casting by the use of a mould of the appropriate shape and dimensions fitted with U-shaped inserts which are capable of being removed when the caps are set. When the caps are moulded in a thermosetting plastic material, the inserts may consist of a low melting point alloy which can be melted out without damage to the cap after it is set. Alternatively the inserts may consist of an elastic material e.g. a silicone rubber, which does not adhere to the material in which the cap is cast and which remains solid and stable at the casting temperature. On setting the elastic insert can be removed by pulling one end, axial elongation leading to radial contraction and permitting easy removal.

The invention will now be described by way of example with reference to the accompanying drawing wherein:

The sole figure of the drawing is an exploded perspective view of one end of solvent separation apparatus in accordance with the invention, certain parts being shown partly cut away for convenience of illustration.

The apparatus comprises seven parallel tubular membrane assemblies 10 constructed in accordance with the invention, each membrane assembly being located within a stainless steel support tube 11. The walls of the support tubes 11 are formed with spaced perforations 12. There may be, for example, four perforations per square inch of tube surface, each perforation having a diameter of from 1.0 to 1.2 mm.

Six of the support tubes and membrane assemblies are evenly spaced around the seventh central tube and assembly. The ends of the tubes 11 are received in solution-tight engagement within parallel axial bores in a cylindrical support block 13 which is moulded in glass filled epoxy resin. The opposite ends of the tubes 11 are also received in similar bores in a corresponding support block (not shown) at the other end of the apparatus.

Received within the ends of the membrane assemblies 10 are hollow bushes 14 of resilient material the bushes having end flanges 15 which overlie the end face of the support block 13.

The support blocks 13 at opposite ends of the apparatus are received within the ends of an encircling stainless steel support tube 16 which surrounds the assembly of tubes 11. A resilient O-ring 17 is located within a circumferential groove in each support block 13 and provides solvent-tight engagement between the block and the tube 16.

Drum shaped end caps 18 are mounted at each end of the apparatus by means of screws 19 which pass through axial bores in each end cap and engage threaded holes in the adjacent support block 13. Each end cap is moulded in one piece from glass filled epoxy resin.

The inner face of each end cap 18 is formed with seven annular recesses 20 positioned to receive the flanges 15 on the bushes 14. Each annular recess 20 surrounds a port communicating with a passage in the end cap 18. In each end cap there are three U-shaped passages 21 extending between ports on the inner face of the end cap, and a passage 22 which passes axially right through the end cap 18. Two of the screws 19 serve also to locate a pipe 23 in communication with the passage 22 in each end cap. One pipe 23 serves as an inlet to the apparatus and the pipe 23 at the opposite end serves as an outlet. Escape of solution between each end cap 18 and each pipe 23 is prevented by sealing rings 24.

The U-shaped passages in the two end caps place pairs of membrane assemblies into communication in such a manner that solution passing through the inlet passage 22 passes back and forth along all the membrane assemblies in turn before leaving the apparatus through the outlet passage in the opposite end cap.

It will be appreciated from the above that the membrane assemblies may be inserted in and withdrawn from the apparatus in a simple manner.

In an alternative arrangement (not shown) there are provided an even number of membrane assemblies in the apparatus, for example, twelve assemblies, and it will be appreciated that in this case the outlet passage must be provided in the same end cap as the inlet passage. The end cap containing both the inlet and outlet passages will therefore contain five U-shaped passages whereas the end cap at the opposite end of the apparatus will contain six U-shaped passages and will not contain any passage passing axially right through the end cap.

Although the end cap 18 is shown as being drum shaped it will be appreciated that it may be of any other suitable shape. For example, it may be in the form of a rectangular block. In this case the ports at the ends of the U-shaped passages and other passages may be arranged in a hexagonal close packed manner in one rectangular face of the block.

It will be appreciated that the number of membrane assemblies in the apparatus may be varied, but in each case where an odd number of assemblies is employed the outlet passage will be in the opposite end cap to the inlet passage whereas when an even number of membrane assemblies is employed both the inlet and outlet passages will be in the same end cap.

Following is a description by way of example of the production of a semi-permeable membrane assembly by the method of the invention.

EXAMPLE

Two fibrous tapes were spirally wound at a speed of 33 mm./second on a mandrel having a diameter of 12.8 mm. to form a tube. The inner tape was unsized 90 gm.$^{-2}$ standard 3500 double fold plain waterleaf paper having a width of 26 mm. and the outer tape was a polyester fibre paper (Freudenberg type SH 1220 PW) having a width of 27 mm. The inner tape was wound with its felt side facing the mandrel and overlapped on itself by about 1 mm., and the outer tape was wound overlapped on itself by between 2 and 3 mm.

An adhesive comprising granules of polyethylene was applied before winding to that surface of the outer tape which was to be adjacent the inner tape, and the adhesive was rendered tacky before winding by heating to a temperature between 110° C. and 150° C. As the winding progressed the overlapped portions of the outer ply were heat-sealed together by contact with a heated shoe consuming a power of 125 watts from a 240 volts single phase supply at 50 cycles/second. (Since the surrounding temperature was 20° C., this power provided a shoe temperature between 300° C. and 350° C.) As the tube left the mandrel a membrane having a thickness of 0.11 to 0.13 mm. was cast onto the inner surface of the tube as described in Example 1 of co-pending application No. 54,755, filed July 14, 1970 corresponding to U.K. application No. 35,786/69.

I claim:

1. A method of producing a semi-permeable membrane assembly, which method comprises spirally winding a porous fibrous tape into a tube to form a ply in which said tape is overlapped on itself by up to 25% of its width, said tape forming said ply being sealable to itself, sealing the overlapped portion of said tape in said ply, and providing a semi-permeable membrane as an additional ply of said tube.

2. The method of claim 1 comprising overlapping said tape on itself by up to 10% of its width.

3. The method of claim 1 comprising winding only one tape into said tube.

4. The method of claim 1 comprising winding an additional porous fibrous tape which is not sealable to itself into said tube.

5. The method of claim 1 comprising casting said semi-permeable membrane on to the inside of the formed tube by a bob casting technique.

6. The method of claim 1 wherein the porous fibrous tape is coated on one surface with a membrane material prior to winding the tape into the tube to thereby provide said membrane when the tube is formed.

7. The method of claim 1 comprising winding an additional tape of membrane material into said tube with a portion of said additional tape overlapping itself, and sealing said overlapping portion to thereby provide said membrane.

8. The method of claim 1 comprising winding a porous fibrous tape which is heat sealable to itself into said tube with a portion of the tape overlapped on itself, and heat sealing said overlapped portions.

References Cited

UNITED STATES PATENTS

| | | | |
|---|---|---|---|
| 3,578,175 | 5/1971 | Manjikian | 210—489 |
| 3,400,029 | 9/1968 | Mesrobian et al. | 156—190 X |
| 3,279,333 | 10/1966 | Blair et al. | 156—190 X |
| 3,620,869 | 11/1971 | Stump et al. | 156—191 X |
| 2,829,700 | 4/1958 | Stahl et al. | 156—190 X |
| 3,457,170 | 7/1969 | Havens | 210—490 X |
| 3,610,420 | 10/1971 | Sampson et al. | 210—490 |
| 3,612,282 | 10/1971 | Cheng | 210—490 X |

PHILIP DIER, Primary Examiner

U.S. Cl. X.R.

156—195, 293; 210—321, 490